ated Nov. 14, 1967

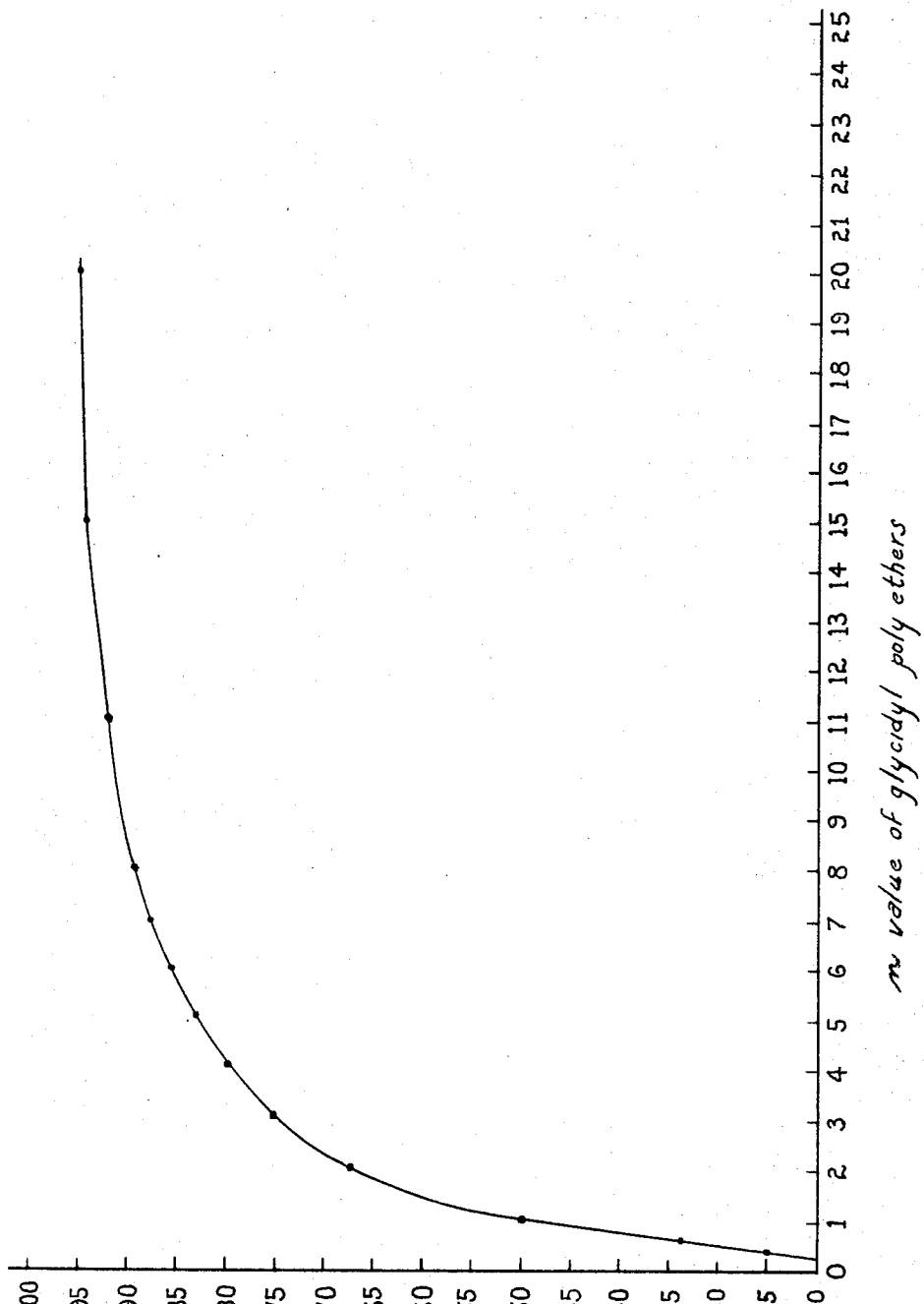

3,352,825
PREPARATION OF GLYCIDYL POLYETHERS
Herbert P. Price, Louisville, Ky., assignor to Celanese Coatings Company, New York, N.Y., a corporation of Delaware
Filed Apr. 28, 1966, Ser. No. 552,998
15 Claims. (Cl. 260—47)

ABSTRACT OF THE DISCLOSURE

An improved process for preparing a linear polymeric glycidyl polyester of a hydric phenol by the reaction of excess epichlorohydrin with said dihydric phenol in the presence of catalytic amounts of alkali metal or ammonium salts of an inorganic monobasic acid, controlling the condensation reaction so as to provide a product having specific amounts of free phenolic hydroxyl groups, removing the excess epichlorohydrin and dehydrohalogenating the reaction condensate.

---

This application is a continuation-in-part of my copending U.S. patent application Ser. No. 62,230, filed Oct. 12, 1960, and now abandoned.

This invention relates to a novel process for the preparation of polymeric epoxide resins.

More particularly, this invention relates to a novel process for the preparation of linear polymeric glycidyl polyethers of dihydric phenols, which polyethers can be represented by the general formula:

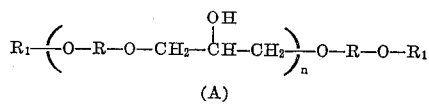

(A)

In this formula R represents the residue or nucleus of the dihydric pehnol used in preparing the glycidyl polyether, i.e., the dihydric phenol molecule minus its phenolic hydroxyl groups, $R_1$ represents the epoxide-containing (glycidyl) residue

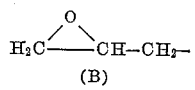

(B)

and $n$ indicates the extent of polymerization.

Illustrative of such glycidyl polyethers are those prepared from Bisphenol A [2,2-bis(4-hydroxyphenyl)propane] and epichlorohydrin, i.e.,

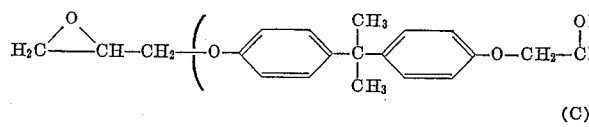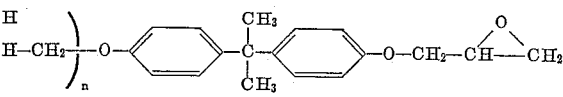

(C)

If $n$ were 0, Formulas A and C hereinabove would represent the monomeric diglycidyl ethers of the dihydric phenols used, e.g., Formula C would represent the diglycidyl ether of Bisphenol A.

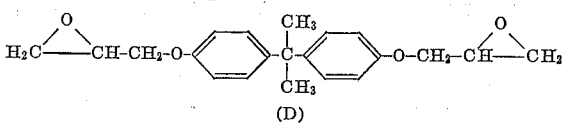

(D)

However, since the glycidyl polyethers prepared by the novel process of the present invention are mixtures of glycidyl polyethers of varying chain length, $n$ will always have an average value greater than 0, i.e., from about 0.25 to about 15, which, in the case of the reaction products of Bisphenol A and epichlorohydrin represented by Formula C hereinabove, corresponds to glycidyl polyethers having molecular weights ranging from about 400 to about 2500 and, accordingly, softening points of from about 20° C. to about 130° C.

Linear polymeric glycidyl polyethers of dihydric phenols, which can also be referred to as polyepoxides or polyepoxide resins, have become increasingly important commercially in recent years. These thermosetting resins can be cured using a wide variety of curing or cross-linking agents to form insoluble, infusible films, pottings, castings, and the like, and are markedly superior in their physical, chemical and electrical properties to other cured thermosetting resins. First of all, they exhibit low shrinkage during curing, and the combination of hardness and toughness exhibited by the cured resins, as well as their resistance to degradation by solvents and other chemicals and their electrical properties, such as dielectric constant and resistivity, can be classed as outstanding. At the same time, these properties can be varied within wide limits depending on the end use intended for the resin.

Various methods of preparing these resins are well known in the art, and have been described in great detail in, for example, U.S. Patents Nos. 2,582,985; 2,615,007 and 2,615,008, all to Greenlee, as well as in Lee & Neville, "Epoxy Resins" (New York: McGraw-Hill Book Company, Inc., 1957).

As shown in these references, typical prior art methods of preparing glycidyl polyethers of the type in question involve either a two-step reaction, wherein a relatively low molecular weight liquid glycidyl polyether is first prepared and then reacted with additional dihydric phenol, or a one-step process of reacting a dihydric phenol with epichlorohydrin wherein the ratio of epichlorohydrin to dihydric phenol is carefully controlled during the reaction.

Monomeric glycidyl polyethers of polyhydric phenols are prepared, as described in the prior art, by reacting a polyhydric phenol with epichlorohydrin in an excess of epichlorohydrin using an amount of caustic alkali, i.e., sodium hydroxide or potassium hydroxide, substantially equivpalent to the phenolic equivalents as both the condensing and dehydrohalogenating agent. The excess epichlorohydrin serves as a solvent for the reaction and is recoverable when the reaction is completed. In this process, substantially all the phenolic hydroxyl groups of the polyhydric phenol are converted to glycidyl ether groups, thus leaving no unreacted phenolic hydroxyls.

Polymeric glycidyl polyethers of polyhydric phenols are prepared, as described in the prior art, by reacting monomeric glycidyl polyethers of dihydric phenols with additional dihydric phenols, or by reacting a dihydric phenol with controlled amounts of epichlorohydrin. In the reaction of the monomeric glycidyl polyethers with dihydric phenols, the glycidyl groups react with the phenolic groups forming glyceryl ether bridges between the components of the reaction, thus resulting in polymer formation.

A specific high molecular weight linear polymeric glycidyl polyether of a dihydric phenol (i.e., one having a specific $n$ value) can also be obtained by reacting specific proportions of epichlorohydrin, varying from about 1.1 mols to about 2.6 mols thereof, per mol of dihydric phenol, with sufficient caustic alkali being used to ultimately combine with the chlorine liberated when the epichlorohydrin residue is dehydrohalogenated to a glycidyl residue. For example, in order to obtain a linear polymeric glycidyl polyether of Bisphenol A having a molecular weight of about 460 to 483, epichlorohydrin and Bisphenol A 2,2-bis(4-hydroxyphenol)propane must be reacted, in the presence of an appropriate amount of caustic alkali, in the ratio of approximately 2.6 mols of epichlorohydrin to 1 mol of Bisphenol A. Similarly, if a linear polymeric glycidyl polyether of Bisphenol A having a molecular weight of about 510 to 710 is desired, epichlorohydrin and Bisphtnol A must be reacted in a mol ratio of 2.04 mols of epichlorohydrin per mol of Bisphenol A, while such a polyether having a molecular weight of about 1420 can only be prepared by this prior art process by reacting epichlorohydrin and Bisphenol A in a mol ratio of 1.22:1, respectively.

In this prior art process, the reaction is conducted by dissolving the dihydric phenol in a large quantity of water with caustic alkali substantially equivalent to the epichlorohydrin which is to be reacted. The reactants are heated to above 65° C., and the specific quantity of epichlorohydrin is added. The epichlorohydrin reacts with the dihydric phenol forming chlorohydrin ether groups which are immediately dehydrohalogenated to glycidyl ether groups. The glycidyl ether groups will then react with phenolic hydroxyl groups forming polymers. The extent of the latter reaction is dependent upon the ratio of epichlorohydrin to dihydric phenol. In this reaction, no epichlorohydrin is recoverable, since all of it is either reacted with the dihydric phenol or is converted to glycerine and other by-products by reaction with the caustic alkali and water.

The copending U.S. patent application of McWhorter et al., Ser. No. 539,605, filed Mar. 15, 1966, discloses that polymeric glycidyl polyethers of specific molecular weights can be prepared by partially reacting a dihydric phenol with epichlorohydrin in a large excess of epichlorohydrin, recovering the excess unreacted epichlorohydrin, and further reacting the partially reacted dihydric phenol (the intermediate condensate) with caustic alkali. More particularly, it has been found that there is a direct relationship between the degree of reaction of the intermediate condensate, as determined by its free phenolic hydroxyl content, and the molecular weight (generally expressed in major part by the number of moieties defined by $n$) of the polyepoxide resin formed from said intermediate condensate on dehydrohalogenation.

The reaction of a dihydric phenol with epichlorohydrin in an excess of epichlorohydrin takes place as illustrated hereinbelow, using for the sake of simplicity, only one phenolic hydroxyl-containing moiety of the dihydric phenol reactant, which will be represented as

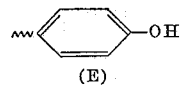

(E)

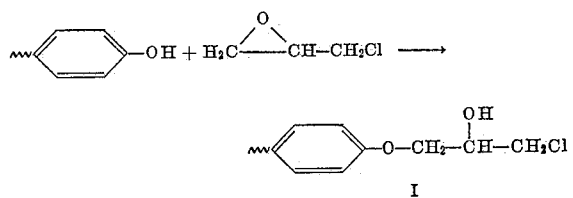

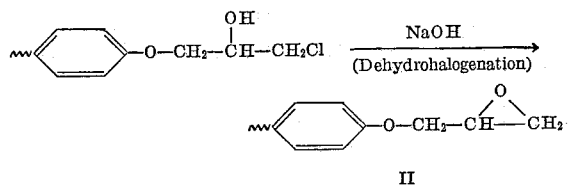

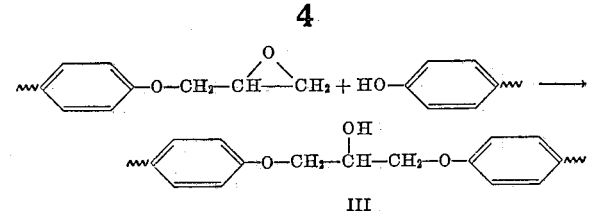

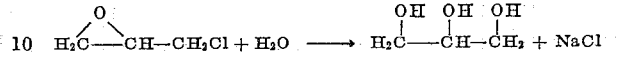

The major reactions among those illustrated above are I and II, the first of these being the addition of epichlorohydrin to the dihydric phenol to form the chlorohydrin ether of said dihydric phenol, which reaction can be termed the condensation reaction and the product obtained thereby the intermediate condensate, and the second being the dehydrohalogenation reaction whereby the chlorohydrin moieties in said intermediate condensate are substantially completely converted to epoxide-containing groups.

At elevated temperatures, e.g., above about 50° C., each of these reactions takes place concomitantly. Thus, caustic alkali catalyzes the dihydric phenol-epichlorohydrin (condensation) reaction, and at the same time reacts with the chlorohydrin ether of the dihydric phenol (intermediate condensate) formed in the condensation reaction, dehydrohalogenating it to form epoxide groupings.

The extent of both the condensation reaction and the dehydrohalogenation reaction is dependent upon the temperature of the reaction mixture and the ratio of epichlorohydrin to dihydric phenol therein. Thus, for example, at relatively low temperatures little dehydrohalogenation occurs, while at elevated temperatures, dehydrohalogenation readily takes place.

At temperatures above about 65° C., the first or condensation reaction takes place at a much faster rate than the dehydrohalogenation reaction, and, in the absence of other factors it would proceed to completion. However, the simultaneously occurring dehydrohalogenation reaction causes caustic alkali to be consumed. Thus, even though the dehydrohalogenation reaction proceeds at a slower rate than the condensation reaction, it has been found that as the chlorohydrin ether is formed the level of caustic alkali present is reduced, thus inhibiting the progress of the condensation reaction.

However, by operating the condensation reaction under dehydrohalogenating conditions, and at the same time carefully controlling the extent of condensation in the manner described hereinbelow, it is possible to terminate the reaction before all the dihydric phenol present condenses with the epichlorohydrin. This gives a specific partially reacted intermediate condensate having free phenolic hydroxyl groups (rather than merely alcoholic hydroxyl groups, which are also formed during the condensation reaction), from which unreacted epichlorohydrin can then be distilled, and which, upon subsequent dehydrohalogenation, gives a specific polyepoxide resin.

When practicing the novel process disclosed in the aforementioned McWhorter et al. application, using excess epichlorohydrin and less than an equivalent amount of caustic alkali, two reactions besides those illustrated hereinabove can also take place, namely,

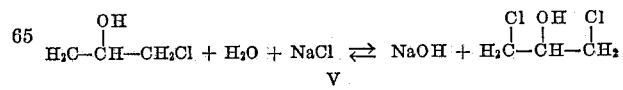

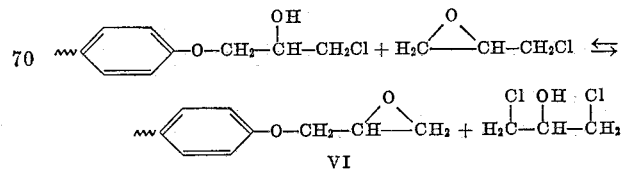

with Reaction V being somewhat more likely to occur, depending on the method used to control the extent of condensation.

To understand how to control the condensation reaction so as to prepare the intermediate condensate, one should first consider Reactions I and V hereinabove. From these reactions it can be seen that the phenolic hydroxyl content of the intermediate condensate is a function of both caustic alkali concentration and time. More particularly, the phenolic hydroxyl content is a function of caustic alkali concentration because the larger the amount of caustic alkali added prior to the time equilibrium is reached the further Reaction I will proceed. It is also a function of time because if, after equilibrium conditions are reached, Reaction V takes place, additional caustic alkali will be formed which will further catalyze Reaction I.

Practically speaking, although there are two methods which can be used to prepare a given intermediate condensate when caustic alkali is the catalyst, namely, either operating the process under conditions such that Reaction V does not take place, i.e., controlling the amount of caustic alkali present and the amount of water present with no special control of the reaction time, or controlling the reaction time, i.e., continuing the reaction until the desired amount of condensation has occurred and then stopping the condensation reaction by removing the water therefrom, after which substantially no additional caustic alkali will form to further catalyze the condensation reaction, only the second of these methods is available when employing the novel modification in this process which is the subject of the present invention.

Briefly stated, it has now been found that when preparing intermediate condensates which will be subsequently dehydrohalogenated to form polymeric glycidyl polyethers, if Reaction V as illustrated hereinabove is allowed to take place caustic alkali need not be used during the condensation reaction (although it can of course be used during the dehydrohalogenation reaction), and in its place certain salts of monobasic organic and inorganic acids (acids having one hydrogen atom which can be replaced by a metal ion or other positive radical), e.g., the alkali metal, such as sodium and potassium, and ammonium salts of nitric, hydrochloric, hydrobromic, hydriodic, thiocyanic, acetic, propionic, butyric, benzoic, carbonic and phosphoric acids (with the last two being less desirable due to the relatively long reaction times necessary when using them), and the like, whether made directly or indirectly from the acid, can be used.

Since only a catalytic amount of hydroxide, e.g., sodium hydroxide, is necessary to promote Reaction I, the sodium hydroxide which would be formed in Reaction V from a sodium salt, such as sodium bromide, sodium iodide or sodium thiocyanate, is sufficient to catalyze this reaction, and as sodium hydroxide formed in Reaction V is withdrawn from the system by Reaction II, an additional quantity, determined by equilibrium conditions, is formed. The glycerol dichlorohydrin formed in Reaction V is converted back to epichlorohydrin during the dehydrohalogenation step. The fact that a catalytic quantity of hydroxide promotes Reaction I also means that only a trace of water is necessary. In fact, sufficient water to permit Reaction V to take place is generally incorporated with the initial reactants, particularly the epichlorohydrin, since water is used in preparing it from allyl chloride.

In the modified process of the present invention, the following reactions are believed to occur:

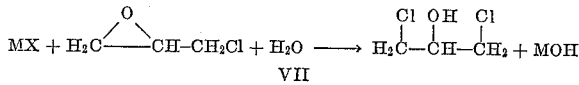

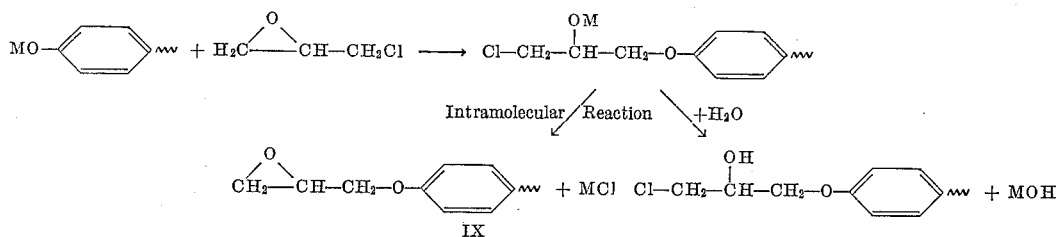

In the above formulas M represents the metal ion or other positive radical in the salt, e.g., a sodium or potassium ion, and X represents the residue of the monobasic acid used in forming the salt.

When water is present, the salt MX will react as in Equation VII, and the hydroxide formed (MOH) will in turn react as in Equation VIII. But even in completely anhydrous systems salts can still be used, since in the absence of water the dihydric phenol present will furnish an available hydrogen ion, and Reaction IX will take place.

The amount of salt employed in practicing the novel process of the present invention will generally range from about 0.01 to about 0.3 mol per mol of dihydric phenol used.

Obviously, the novel process of the present invention can be carried out so as to make different partially reacted intermediate condensates having different free phenolic hydroxyl contents, and thus a series of polyepoxide resins, having any desired molecular weights, can be made by a single process using an excess of epichlorohydrin beyond that required for complete reaction with the dihydric phenol, rather than the small, specific amounts formerly considered critical. Such a process lends itself much more readily to efficient plant operation, and especially to continuous operation, and in fact is easier to carry out than known processes used to prepare polyepoxide resins.

In such prior art processes, as stated above, epichlorohydrin and a dihydric phenol are reacted in specific critical ratios, which means that the epichlorohydrin present is kept to an irreducible minimum, and the polyepoxide resin is directly formed by the use of an amount of caustic alkali equivalent to the chlorine atoms in the epichlorohydrin present. However, the thus-formed polyepoxide resin is generally a viscous, taffy-like material, which can be extremely difficult to work due to the lack of sufficient epichlorohydrin to form a solution. As a result, it becomes increasingly difficult to stir the reaction mixture so as to bring about reaction between all the epichlorohydrin and the dihydric phenol. Furthermore, the large quantities of water present promote hydrolysis of the epichlorohydrin to undesirable side products.

In contrast to this, the novel process of the present invention permits the use of amounts of epichlorohydrin over and above those required for the condensation reaction, and thus the reaction medium is a solution, easy to process and handle.

In carrying out this novel process, the system reacts vigorously, as evidenced by an exotherm, when the reactants and catalyst are first brought together, e.g., upon the first addition of the salt catalyst to a mixture of epichlorohydrin and a dihydric phenol. As the quantity of chlorohydrin ether formed increases, the reactions taking place are believed to approach their equilibria at a fairly slow, controllable rate. In the initial stages of the process, the epichlorohydrin obviously does not react with all the phenolic hydroxyl groups present. This means that as the system approaches equilibrium during the later stages of the process, the unreacted phenolic hydroxyl groups will be slowly condensed with epichlorohydrin. Thus, it follows that if the initial condensation reaction is not carried to substantial completion, the resulting intermediate condensate will contain unreacted phenolic hydroxyl groups.

This condensate, upon removal of the excess epichlorohydrin, in a mixture which can contain dihydric phenols, e.g., unreacted starting material

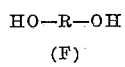

(F)

or partially condensed materials

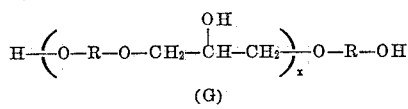

(G)

phenolic hydroxyl-terminated monochlorohydrin ethers of the dihydric phenol

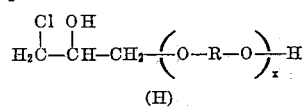

(H)

dichlorohydrin ethers of the dihydric phenol

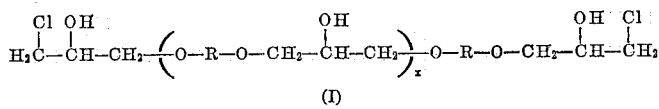

(I)

phenolic hydroxyl-terminated monoglycidyl ethers of the dihydric phenol

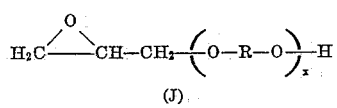

(J)

diglycidyl ethers of the dihydric phenol

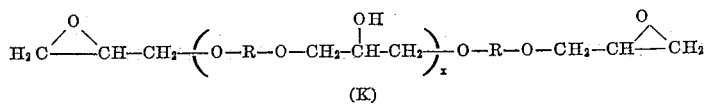

(K)

and monoglycidyl-monochlorohydrin ethers of the dihydric phenol

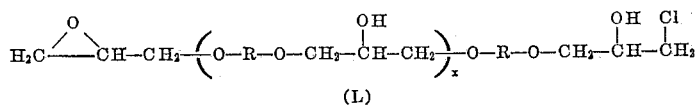

(L)

wherein R has the same meaning as set forth hereinabove for Formula A and X represents an integer, not necessarily the same in all cases, which can be 0 or greater, but generally less than 15.

Since on dehydrohalogenation the chlorohydrin ether moieties in the various possible components of this intermediate condensate will be substantially completely converted to glycidyl ether groups, said condensate is essentially a mixture of glycidyl ether-containing, glycidyl ether-forming and phenolic hydroxyl-containing components.

The efficiency of the novel process of the present invention is also attributable to the fact that it results in a substantial saving in epichlorohydrin. Not only is less epichlorohydrin lost in the overall process than in prior art processes, but it has also been found that less epichlorohydrin is consumed during the reaction itself, since only from about 1.05 to about 1.8 mols of epichlorohydrin are condensed per mol of dihydric phenol.

One would expect that when polyepoxide resins of the type in question are made by conventional prior art processes, the low mol ratios of epichlorohydrin to dihydric phenol employed would insure very little loss of epichlorohydrin. This, however, is not the case. For example, in a typical prior art process wherein 312 parts of a glycidyl polyether having a weight per epoxide of 200–250 are prepared using a ratio of 2.6 mols of epichlorohydrin per mol of dihydric phenol, the full 2.6 mols of epichlorohydrin are consumed per mol of the dihydric phenol. In contrast to this, only 1.75 mols of epichlorohydrin per mol of dihydric phenol are consumed in preparing 312 parts of the same resin by the novel process of the present invention, even taking into account an assumed 1% loss of epichlorohydrin during distillation.

This saving in epichlorohydrin is believed due to there being very little loss of epichlorohydrin through side reactions. For example, while Reaction IV illustrated hereinabove takes place to some extent in conventional processes due to the presence of large quantities of water and quantities of caustic alkali equivalent to, or in excess of, the epichlorohydrin used, this side reaction is largely absent when carrying out the novel process of the present invention, inasmuch as neither caustic alkali nor large quantities of water are used initially, and the amount of caustic alkali formed during the reaction is substantially less than an equivalent of the amount of epichlorohydrin employed. Thus, this novel process is efficient not only from an operational standpoint but also because lesser amounts of raw materials are necessary.

It has also been found that the novel process of the present invention produces polyepoxide resins having a lower epoxide equivalency per given melting point. In other words, more 1,2-epoxy groups are formed than by conventional processes, and the products obtained more closely approach the products which theoretically can be obtained.

As previously indicated, control of the reaction time is the method employed in controlling this novel process. This being the case, the condensation reaction may continue to a slight extent during the distillation of water and excess epichlorohydrin from the system, due primarily to the fact that condensation rates are not the same for all dihydric phenols and catalysts. This can be compensated for by allowing for distillation times in the analytical determination of phenolic hydroxyl content.

At this point, two additional factors which can influence the reaction time should also be mentioned. First of all, the water content of the system can affect the time involved in reacting the dihydric phenol with epichlorohydrin. Thus, while amounts of water up to about 1% by weight, based on the weight of epichlorohydrin present, will have little or no affect, larger amounts, e.g., up to about 3% by weight, on the above-stated basis, will cause an increase in catalytic activity, and the desired intermediate condensate can be obtained in a shorter time.

Similarly, the reaction period can be shortened or lengthened by the selection of the appropriate salt catalyst. Potassium thiocyanate, for instance, will cause the formation of an intermedite condensate having a particular $n$ value much more quickly than will sodium chloride or sodium nitrate. In general, the cation of the salt appears to have the greatest influence on the speed of reaction, with potassium salts being the most reactive, ammonium salts next and sodium salts the least. Anions such as iodide, bromide, chloride, nitrate and thiocyanate all appear approximately equal in reactivity. Anions of weak acids such as acetate and bicarbonate are less reactive, but can be used if reaction times of up to about 72 hours or longer are employed.

Thus, while it is true that condensation rates are not the same for all dihydric phenols and catalysts, the results obtained in any particular reaction are reproducible. This being the case, once an intermediate condensate having a particular $n$ value is obtained after a given reaction period using a particular dihydric phenol and a particular salt catalyst, the same intermediate condensate will be obtained in the same time if the reaction is repeated. In addition, since the reaction rates experienced when salts are employed as the catalyst are not as rapid as those which obtain when caustic alkali is used, analytical determinations can be made as the reaction proceeds, and when a given intermediate condensate is obtained, the reaction can be stopped by lowering the temperature or removing unreacted epichlorohydrin by distillation.

Numerous analytical methods are available for determining the phenolic hydroxyl content of the intermediate condensate. Among these are methods involving the use of reagents, e.g., the Million reagent, referred to in chapter 4 of Snell & Snell, "Colorimetric Methods of Analysis," vol. 3 (New York: D. Van Nostrand Co., Inc., 1953). Another useful method involves the use of near-infrared analysis, as described by Holman & Edmondson in Analytical Chemistry, vol. 28 (1956) at page 1533.

An indirect method for determining the phenolic hydroxyl content of the intermediate condensate can be practiced as follows. The reaction is carried out as described in the working examples given hereinbelow but using tared reaction vessels and molar quantities of reactants and catalyst. The weight of the intermediate condensate and salt formed is determined after removal of unreacted epichlorohydrin, and the weight increase due to reacted epichlorohydrin is then calculated according to the following equation:

Weight increase due to reacted epichlorohydrin = Weight of intermediate condensate plus salt − (Weight of dihydric phenol plus salt catalyst minus water of reaction).

Next, the salt is removed from the intermediate condensate, the condensate is weighed, and the weight per epoxide is determined by standard methods. The epoxide equivalent of the intermediate condensate is then calculated by dividing the weight of the intermediate condensate by the weight per epoxide. This epoxide equivalent is theoretically equal to the amount of glycerol dichlorohydrin formed. The epichlorohydrin actually condensed (in mols) is determined by adding the epoxide equivalent multiplied by 36.5, the molecular weight of HCl (which has been lost from the intermediate condensate by disproportionation to glycerol dichlorohydrin) to the figure for the weight increase in the intermediate condensate due to reacted epichlorohydrin. Finally, by subtracting two from the total weight of epichlorohydrin condensed the equivalent of unreacted phenolic hydroxyl groups present is obtained.

A reasonably accurate method of determining the number of mols of epichlorohydrin condensed per mol of dihydric phenol, which in turn can be converted into a value for the phenolic hydroxyl content of the intermediate condensate in the manner set forth in the preceding paragraphs, involves first measuring the viscosity of the intermediate condensate. This can be done by removing a sample from the reaction vessel, separating unreacted epichlorohydrin therefrom by flash distillation, and then filtering out the salt. The viscosity of this purified sample can then be determined, using a solvent if necessary, and this viscosity can then be compared with a previously prepared curve plotting viscosity against the mols of epihalohydrin reacted per mol of dihydric phenol (unreacted phenolic hydroxyl content).

Dihydric phenols have previously been reacted with epichlorohydrin using less than the stoichiometric amount of caustic alkali. In these prior art proceses, however, low temperatures were employed so that a dehydrohalogenation reaction would not accompany the condensation reaction. Thus, it would appear that the concept of altering the reaction rates of the concomitant condensation and dehydrohalogenation reactions has not been previously employed.

Similarly, in prior art processes wherein relatively high temperatures were employed, the condensation reaction has been carried out in such a manner that substantially all of the dihydric phenol was converted to chlorohydrin ether before dehydrohalogenation could occur. Again, insofar as it has been able to determine it was not believed possible, according to the prior art, to prepare partially reacted intermediate condensates in a manner which would give reproducible results. Contrary to this belief, the present invention, which as previously indicated is based on the discovery of the direct relationship between the phenolic hydroxyl content of the intermediate condensate and the molecular weight of the ultimately obtained polyepoxide resin, provides a process whereby intermediate condensates of any desired phenolic hydroxyl content can be made and reproduced.

In practicing the novel process of the present invention, changes in temperature and epichlorohydrin: dihydric phenol ratio produce variations in the condensation products which are somewhat less pronounced than those produced by varying the reaction time. With respect to the epichlorohydrin: dihydric phenol ratio, it has been found that more condensation takes place at a ratio of 10:1, epichlorohydrin: dihydric phenol, respectively, than at a ratio of 5:1 or 3:1. Accordingly, for low molecular weight products the 10:1 ratio is desirable, while for higher molecular weight products the ratio can be reduced to as low as about 3:1.

With respect to reaction temperature, the only requirement is that it be high enough to insure that the overall reaction conditions are as favorable for dehydrohalogenation as for epichlorohydrin-phenol condensation. Normally, except during the removal of water and unreacted epichlorohydrin from the system, the reaction temperature will be at or below the reflux temperature of the system, and will generally be at least about 50° C., and preferably from about 90° C. to about 100° C., depending on the reactants employed. Since the exotherm experienced when using a salt catalyst is not so great as when caustic alkali is the catalyst, higher reaction temperatures can usually be employed. In this connection, it should also be noted that it is unnecessary to add the salt catalyst incrementally when carrying out a batch process, as is generally necessary when caustic alkali is used, since the addition of the salt catalyst usually does not generate sufficient heat to bring the reactants to a boil. Temperatures above 100° C., e.g., up to about 150° C., can of course be used, particularly (although not necessarily) if pressures above atmospheric are employed, while at the lower end of the temperature range the only requirement is that the temperature employed must be sufficiently high to promote the dehydrohalogenation reaction.

Thus, a preferred embodiment of the novel process of the present invention includes reacting a dihydric phenol such as Bisphenol A with epichlorohydrin at reflux temperature, using a neutral salt, and more particularly a sodium, potassium or ammonium salt of a strong acid, as the catalyst, to produce an intermediate condensate having a predetermined phenolic hydroxyl content in the range of from about 0.2 to about 0.95 phenolic hydroxyl group per mol of said dihydric phenol employed.

The molecular weight of the glycidyl polyether obtained from the thus-prepared intermediate condensate by stripping said condensate free of unreacted epichlorohydrin and then dehydrohalogenating in the conventional manner, expressed approximately in terms of the value of $n$, is determined by the equation $$n = \frac{OH}{(1-OH)}$$

wherein $n$ represents, as defined hereinabove, the average number of repeating

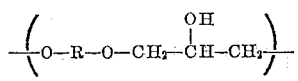

units in the polyether molecule and OH represents the number of unreacted phenolic hydroxyl groups per mol of dihydric phenol starting material (which quantity is subsequently referred to as the phenolic hydroxyl content of the intermediate condensate).

In making a polymeric glycidyl polyether having a desired $n$ value the equation $$OH = \frac{n}{n+1}$$

will be used, wherein OH and $n$ have the meanings expressed hereinabove. The intermediate condensate having the thus-determined phenolic hydroxyl content is stripped free of excess epichlorohydrin and dehydrohalogenated in the conventional manner, e.g., as described in U.S. Patent No. 2,581,464 to Zech or in any of the other references mentioned hereinabove.

As indicated above, the $n$ value of the final polyepoxide resin is directly proportional to the phenolic hydroxyl content of the intermediate condensate. However, there will be some variance from dihydric phenol to dihydric phenol. Also, it has been noted that as the ratio of epichlorohydrin to dihydric phenol increases, the proportionality constant will also vary because of the dilution of the system.

To further illustrate the relationship between the unreacted hydroxyl groups in the intermediate condensate (or, in other words, the phenolic hydroxyl content) per mol of starting dihydric phenol and the $n$ value of the polymeric glycidyl polyether obtained therefrom, reference is made to the accompanying drawing wherein:

The figure is a curve obtained by plotting the $n$ value of the polymeric glycidyl polyether as the abscissa against the free phenolic hydroxyl content of the intermediate condensate per mol of starting dihydric phenol as the ordinate.

The present invention can perhaps be better understood by reference to the following working examples and tables, which are given solely for the purpose of illustrating the invention. Thus, they should not be considered as expressing limitations unless so set forth in the appended claims. In these examples "hydroxyl content" means "phenolic hydroxyl equivalent," and all parts and percentages are by weight, unless otherwise stated.

EXAMPLE I

PART I

A charge of 228 grams of Bisphenol A was dissolved in 925 grams of epichlorohydrin and 9 grams of water contained in a 2-liter, three-neck, round-bottom flask equipped with a thermometer, stirrer and reflux condenser. The resulting solution was then heated, with stirring to 60° C. At this point, 1.2 grams of potassium bromide were added and the resulting reaction mixture was heated to reflux temperature (109° C.) and maintained at that temperature for 3 hours. Following this reaction period a distillation apparatus was fitted to the flask and excess epichlorohydrin and glycerol dichlorohydrin were distilled off, the temperature being gradually raised to 150° C. during distillation. Then, under vacuum (1 mm. Hg); the temperature was raised to 160° C. The resulting intermediate condensate had a weight per epoxide of 815, a hydrolyzable chlorine content of 9.5 and a phenolic hydroxyl content of 0.65.

PART II

In a two-liter flask equipped with thermometer, stirrer, and reflux condenser, 217 grams of the intermediate condensate of Part I hereinabove and 200 cc. of water were heated with stirring to 60° C., then admixed with 56 grams of an aqueous 50% sodium hydroxide solution. The temperature of the flask contents was then raised to reflux (104° C.) and held there for 90 minutes. At the end of this time, the water has poured off and the resulting resin dissolved in 200 cc. of methyl isobutyl ketone. This solution was then neutralized with an aqueous 30% phosphoric acid solution and the water was separated and drawn off. The resulting solution was further dried by azeotropically distilling off the remaining water with part of the methyl isobutyl ketone (to 120° C.).

The flask contents were then filtered and the solvent removed by distillation under vacuum (1 mm. Hg) to 160° C. The properties of the resulting resin are given in Table I below.

*Table I*

| | |
|---|---|
| Weight per epoxide: | |
|    Theoretical | 435 |
|    Actual | 393 |
| Total chlorine content [1] | 0.8 |
| Melting point [2] | 55 |
| Viscosity [3] | D |

[1] Percent.
[2] In ° C.; Durran's mercury method.
[3] Gardner-Holdt; 40% non-volatiles in butyl carbitol.

The procedure of Example 1 hereinabove was then repeated in every detail except for those noted in Table II hereinbelow. The properties of the products obtained are also given in Table II.

*Table II*

| | |
|---|---|
| Intermediate condensate— | |
|   Preparation: | |
|     Epichlorohydrin, mols | 10 |
|     Bisphenol A, mols | 1 |
|     Salt Catalyst | $NH_4Cl$ |
|       Mols | 0.01 |
|     Water, grams | 9 |
|     Time, hours | 6 |
|     Temperature, ° C. | 111 |
|   Properties: | |
|     Weight per epoxide | 597 |
|     Hydrolyzable chlorine content, percent | 9.0 |
|     Phenolic hydroxyl content | 0.48 |
| Polymeric glycidyl polyether resin— | |
|   Preparation: | |
|     Intermediate condensate, grams | 215 |
|     Sodium hyroxide, grams | 53 |

Properties:
Weight per epoxide—
  Theoretical _____ 302
  Actual _____ 297
  Total chlorine content, percent _____ 0.45
  Melting point, °C. (Durran's mercury
    method) _____ 38
  Viscosity, Gardner-Holdt (40% non-
    volatiles in Butyl Carbitol) _____ A

EXAMPLE II

Part I

The manner described in Part I of Example I hereinabove, 228 grams of Bisphenol A were dissolved in 925 grams of epichlorohydrin and 9 grams of water, and this solution was heated to 60° C., at which temperature 0.97 gram of potassium thiocyanate was added and the resulting reaction mixture heated to reflux (110° C.) and held for 3 hours. At the end of this time, the flask was fitted for distillation and excess epichlorohydrin and glycerol dichlorohydrin were distilled off by raising the temperature gradually to 150° C. The flask contents were then heated under vacuum (1 mm. Hg) with the temperature being raised to 160° C. The resulting intermediate condensate had a weight per epoxide of 981, a hydrolyzable chlorine content of 9.6%, and a phenolic hydroxyl content of 0.69.

Part II

In a one liter flask equipped with thermometer, dropping funnel, stirrer and reflux condenser, 290 grams of the above-prepared intermediate condensate and 275 grams of methyl isobutyl ketone were heated to reflux (118° C.) at which temperature heating was discontinued and the dropwise addition of 75.4 grams of 50 percent aqueous sodium hydroxide was begun and continued over a period of one and one-half hours, the temperature dropping slowly to 97–100° C. during this time. When all of the sodium hydroxide had been added, the flask contents were heated to reflux and held at that temperature for one hour. The flask contents were then cooled to 90° C. and 100 cc. of water were added to dissolve the salt formed. The separated water was drawn off and the solution was then neutralized with an aqueous 30% phosphoric acid solution. The resin solution was further dried by azeotropically distilling off the remaining water with part of the methyl isobutyl ketone to 120° C. The flask contents were then filtered and the solvent removed by distillation under water aspirator vacuum to 150° C., and then under vacuum by pump (1 mm. Hg) to 160° C. The properties of the resulting resin are given in Table III below.

Table III

Weight per epoxide:
  Theoretical _____ 486
  Actual _____ 563
Total chlorine content [1] _____ 1.8
Melting point [2] _____ 79
Viscosity [3] _____ I

[1] Percent.
[2] In °C.; Durran's mercury method.
[3] Gardner-Holdt; 40% non-volatiles in Butyl Carbitol.

EXAMPLE III

In a two-liter, three-neck, round-bottom flask, equipped with a thermometer, stirrer, and reflux condenser, 114.9 grams of Bisphenol A, 462.5 grams of epichlorohydrin and 1.5 grams of potassium iodide dissolved in 6 cc. of water were mixed together and heated to reflux (109° C.), maintained at reflux for three hours, and then filtered. The filtrate was then distilled at 150° C. to remove any excess epichlorohydrin and glycerol dichlorohydrin formed in the reaction. The resulting condensate (165.5 grams) had a weight per epoxide of 1035, a hydrolyzable chlorine content of 10.5% and a phenolic hydroxyl content of 0.7, which is known to give on dehydrohalogenation, a polyepoxide having an $n$ value of 2.3.

To illustrate the preparation of other intermediate condensates, Table IV is given below. Both the conditions of preparation and the properties of the resulting condensates are contained in the table.

TABLE IV

| Intermediate Condensates | A | B | C | D | E | F | G | H | I | J |
|---|---|---|---|---|---|---|---|---|---|---|
| Preparation: | | | | | | | | | | |
| Epichlorohydrin, mols | 10 | 10 | 10 | 5 | 3 | 10 | 10 | 10 | 10 | 10 |
| Bisphenol A, mols | 1 | 1 | 1 | 1 | 1 | 1 | 1 | | 1 | 1 |
| Resorcinol, mols | | | | | | | | 1 | | |
| Salt Catalyst | KBr | KBr | KBr | KBr | KBr | KNO$_3$ | KBr | KBr | KBr | KBr |
| Mols | 0.10 | 0.01 | 0.01 | 0.01 | 0.01 | 0.25 | 0.01 | 0.3 | 0.01 | 0.01 |
| Water, grams | 9 | 0 | 9 | 4.5 | 2.8 | 12 | 27 | 9 | 9 | 9 |
| Time, hours | 3 | 3 | 3 | 3 | 3 | 3 | 3 | 3 | 3 | 6 |
| Temperature, °C | 110 | 120 | 109 | 118 | 128 | 110 | 98 | 110 | 110 | 111 |
| Properties: | | | | | | | | | | |
| Weight of condensate, grams | 332 | 327.8 | 328.8 | 322 | 317 | 334 | 339.8 | 335 | 243 | 252 |
| Weight per epoxide | 1,048 | 1,136 | 1,103 | 1,224 | 1,124 | 1,173 | 840 | 1,022 | 618 | 437 |
| Hydrolyzable chlorine content, percent | 9.4 | 9.5 | 9.6 | 8.96 | 8.2 | | 9.9 | 9.7 | 16.5 | 15.5 |
| Phenolic hydroxyl content | 0.75 | 0.80 | 0.79 | 0.85 | 0.93 | 0.74 | 0.63 | 0.71 | 0.40 | 0.23 |
| n-Value on dehydrohalogenation | 3 | 4 | 3.8 | 5.7 | 13.3 | 2.8 | 1.7 | 2.45 | 0.67 | 0.3 |

Applicant's discovery that salts can be used as catalysts in the preparation of the intermediate condensate can also be adapted to other processes. Thus, an intermediate which on dehydrohalogenation would yield a composition having terminal phenolic hydroxyl groups instead of epoxide groups can be made. Such intermediates have hydroxyl equivalent values greater than one based on one mol of initially employed phenol. Glycidyl polyethers can, however, be made from these intermediate condensates. If the hydroxyl equivalency is too high or if it is above one, the dehydrohalogenation can be carried out in the presence of an epihalohydrin. This embodiment is illustrated by the following example. The amount of epihalohydrin added is that which when subtracted from the phenolic hydroxyl equivalent value results in a value on the curve of the drawing. Thus, if the actual phenolic hydroxyl value is 0.99 and an $n$ value of 3 is desired requiring a hydroxyl value of 0.75, 0.99 minus 0.75 or 0.24 equivalent of epihalohydrin is used during dehydrohalogenation.

EXAMPLE IV

Part I

In a two liter, three-neck round-bottom flask equipped with thermometer, stirrer and reflux condenser, 228 grams of Bisphenol A were dissolved in 925 grams of epichlorohydrin and 9 grams of water. This solution was then heated with stirring to 60° C., at which temperature 1.2 grams of potassium bromide were added and the resulting reaction mixture heated to reflux (109° C.). The flask contents were maintained at reflux for a period of three hours, following which the flask was fitted for distillation and excess epichlorohydrin and glycerol dichlorohydrin were distilled off by raising the temperature gradually to 150° C. and then distilling under vacuum (1 mm. Hg) with the temperature being raised to 160° C. The resulting intermediate condensate (Condensate K) had a weight per epoxide of 1191 and a hydrolyzable chlorine content of 9.4%.

PART II

Two additional intermediate condensates (Condensates L and M) were prepared in the manner described in Part I above, and the conditions of preparation, as well as the properties of the thus-obtained condensates, are given in Table V below.

Table V

| Intermediate Condensates | L | M |
|---|---|---|
| Preparation: | | |
| Epichlorohydrin: Bisphenol A, ratio | 10:1 | 10:1 |
| Salt catalyst | NaI | NH$_4$Cl |
| Mols | 0.01 | 0.01 |
| Water, grams per mol of Bisphenol A | 9 | 9 |
| Time, hours | 6 | 3 |
| Temperature, °C | 111 | 110 |
| Properties: | | |
| Weight of condensate, grams | 315.5 | 322.5 |
| Weight per epoxide | 1664 | 1231 |
| Hydrolyzable chlorine content, percent | 9.2 | 8.9 |
| Phenolic hydroxyl content | 0.97 | 0.88 |

PART III

In a two liter flask equipped with stirrer, thermometer, and reflux condenser, 250 grams of Condensate K of Part I above and 23.3 grams of epichlorohydrin were heated with agitation to 50° C. in order to dissolve the epichlorohydrin. Then, 250 cc. of water were added and the mixture heated to 60° C., at which temperature 88 grams of an aqueous, 50% sodium hydroxide solution were added. The temperature of the flask contents was then raised to reflux temperature (104° C.) and held there for one and one-half hours. At the end of this period the water was poured off and the resulting taffy-like resin was dissolved in 250 cc. of methyl isobutyl ketone. This solution was then neutralized with an aqueous, 30% phosphoric acid solution and the separated water was drawn off. The solution was further dried by azeotropically distilling off the remaining water with part of the methyl isobutyl ketone to 120° C.

The flask contents were then filtered and the solvent removed by distillation under vacuum (1 mm. Hg) to 160° C.

This procedure was then repeated using Condensates L and M in place of Condensate K. The amounts of reactants used in these last two runs and the properties of the resins (identified as Resins K, L and M) resulting from all three runs are given in Table VI below.

Table VI

| Polymeric Glycidyl Polyether Resins | K | L | M |
|---|---|---|---|
| Preparation: | | | |
| Amount of intermediate condensate, grams | | 230 | 282 |
| Epichlorohydrin, grams | | 24.8 | 55 |
| Sodium hydroxide, grams | | 83 | 115 |
| Properties: | | | |
| Weight per epoxide: | | | |
| Theoretical | 312 | 386 | 198 |
| Actual | 404 | 517 | 348 |
| Melting point, °C, Durran's mercury method | 51.5 | 71 | 41 |
| Viscosity, Gardner-Holdt, 40% non-volatiles in Butyl Carbitol | C | F | B |

It will be obvious that other substitutions which would readily occur to one skilled in the art can also be made in practicing the present invention. For example, mononuclear dihydric phenols such as catechol, orcinol and xylorcinol, and polynuclear dihydric phenols such as 4,4'-dihydroxybenzophenone; 1,1 - bis(4 - hydroxyphenyl) ethane; 1,1-bis(4-hydroxyphenyl)isobutane; 2,2-bis(4-hydroxyphenyl)butane; 2,2 - bis(4-hydroxy-2-methylphenyl) propane; bis(2-hydroxynaphthyl)-methane and 1,3-dihydroxynaphthanel, and the like, can be used in addition to or instead of Bisphenol A or resorcinol.

The phenolic hydroxy content of the free phenolic hydroxyl-containing intermediate condensates produced by the novel process of the present invention can be further modified by incorporating additional dihydric phenol therein in the manner described in copending U.S. patent application Ser. No. 62,279, filed Oct. 12, 1960, and resulting materials can then be dehydrohalogenated to give polyepoxide resins having specific, predetermined molecular weights.

As indicated hereinabove, applicant's novel process is especially suited to continuous operation. One suitable method of operating the process continuously can be briefly stated as involving introducing the dihydric phenol, epichlorohydrin and salt catalyst either continuously or at regular intervals into a first reaction zone, carrying out the condensation reaction in said first reaction zone, continuously withdrawing the resulting intermediate condensate (admixed with excess epichlorohydrin and, when it has not been separately removed, water) from said first reaction zone, subjecting said intermediate condensate to distillation to remove said excess epichlorohydrin and, when present, water, and then continuously dehydrohalogenating the thus-purified intermediate condensate, using caustic alkali, to give the desired linear polymeric glycidyl polyether. The particular feed rates, operating temperatures, and the like which will be employed in carrying out a continuous process are readily determinable by one skilled in the art from the foregoing detailed description of the present process in general.

Furthermore, it will be equally obvious to those skilled in the art that still other changes and variations can be made in carrying out the present invention without departing from the spirit and scope thereof as defined in the appended claims.

I claim:

1. A process for preparation of a linear polymeric glycidyl polyether of a dihydric phenol represented by the general formula

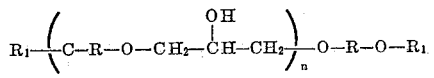

wherein R represents the nuclear of said dihydric phenol, $R_1$ represents the residue

and $n$, which indicates the predetermined extent of polymerization, represents an average value of from about 0.25 to about 15, which comprises (1) bringing together said dihydric phenol and an excess of epichlorohydrin, in a mol ratio of from about 3 to about 10 mols of epichlorohydrin per mol of said dihydric phenol, (2) condensing, at a temperature of from about 50° C. to about 150° C. in the presence of from about 0.01 to about 0.3 mol, per mol of said dihydric phenol of a compound selected from the group consisting of alkali metal and ammonium salts of inorganic monobasic acids as catalyst, only from about 1.05 to about 1.8 mols of epichlorohydrin per mol of said dihydric phenol, said condensation being controlled so as to give an intermediate condensate having a free phenolic hydroxyl content in the range of from about 0.2 to about 0.95 phenolic hydroxy group per mol of said dihydric phenol initially present, said intermediate condensate being known by the equation $$OH = \frac{n}{n+1}$$

wherein OH represents the phenolic hydroxyl content of said intermediate condensate and $n$ is as defined hereinabove, to give on dehydrohalogenation said predetermined extent of polymerization as indicated by $n$, (3) removing excess epichlorohydrin from said intermediate condensate, and then (4) dehydrohalogenating said intermediate condensate, using caustic alkali, to give said linear polymeric glycidyl polyether.

2. A process as described in claim 1 wherein said dihydric phenol is 2,2-Bis(4-hydroxyphenyl)propane.

3. A process as described in claim 2 wherein said salt catalyst is a potassium halide.

4. A process as described in claim 2 wherein said salt catalyst is potassium bromide.

5. A process as described in claim 2 wherein said salt catalyst is potassium iodide.

6. A process as described in claim 2 wherein said salt catalyst is a sodium halide.

7. A process as described in claim 2 wherein said salt catalyst is sodium bromide.

8. A process as described in claim 2 wherein said salt catalyst is sodium iodide.

9. A process as described in claim 2 wherein said salt catalyst is potassium thiocyanate.

10. A process as described in claim 2 wherein said salt catalyst is sodium thiocyanate.

11. A process as described in claim 2 wherein said salt catalyst is potassium nitrate.

12. A process as described in claim 2 wherein said salt catalyst is ammonium chloride.

13. A process as described in claim 1 carried out by continuously introducing said dihydric phenol, epichlorohydrin and said salt catalyst into a first reaction zone, carrying out said condensation in said first reaction zone, continuously withdrawing the resulting intermediate condensate from said first reaction zone, subjecting said intermediate condensate to distillation, and continuously dehydrohalogenating the thus-purified intermediate condensate, using caustic alkali, to give the desired linear polymeric glycidyl polyether.

14. A process as described in claim 13 wherein said dihydric phenol is 2,2-Bis(4-hydroxyphenyl)propane.

15. A process as described in claim 13 wherein said dihydric phenol is 2,2-Bis(4-hydroxyphenyl)propane and said salt catalyst is potassium bromide.

References Cited

UNITED STATES PATENTS 2,712,000  6/1955  Zech _____ 260—47

WILLIAM H. SHORT, *Primary Examiner.*

T. D. KERWIN, *Assistant Examiner.*